Nov. 8, 1932.   O. SEITZ   1,887,069

ELECTRIC POWER RECTIFIER ANODE

Filed March 25, 1931

Inventor
Oskar Seitz
By Alfred N. Dyson
Attorney

Patented Nov. 8, 1932

1,887,069

UNITED STATES PATENT OFFICE

OSKAR SEITZ, OF BADEN, SWITZERLAND

ELECTRIC POWER RECTIFIER ANODE

Application filed March 25, 1931, Serial No. 525,225, and in Germany March 24, 1930.

This invention relates to improvements in anode constructions for electric power rectifiers and particularly to anodes constituted of more than one kind of current conductive material.

The anodes of electric power rectifiers of the metallic arc metal enclosed type are generally made of metal which, due to the high temperature encountered in operation, is frequently damaged and may even be destroyed. It is well-known that graphite, being capable of withstanding a high temperature, is a material which is well suited to the conditions met with in a rectifier. Graphite is not, however, capable of satisfactory use when stresses other than pure pressure are encountered and even compression stresses must be minimized due to the low mechanical strength of the material. Further, when metal and graphite are combined to form an anode structure, provision must be made to compensate for the differences in expansion at the temperatures encountered in operation.

It is, therefore, among the objects of the present invention to provide an anode construction for an electric power rectifier in which the head of the anode is made of graphite and the stem of the anode is made of metal.

Another object of the invention is to provide a combined graphite and metal anode for an electric power rectifier in which anode the graphite portions are stressed only in compression.

Another object of the invention is to provide a combined graphite and metal anode for an electric power rectifier in which anode the graphite and metal portions are constructed to permit variations in expansion between the different material.

Figure 1:
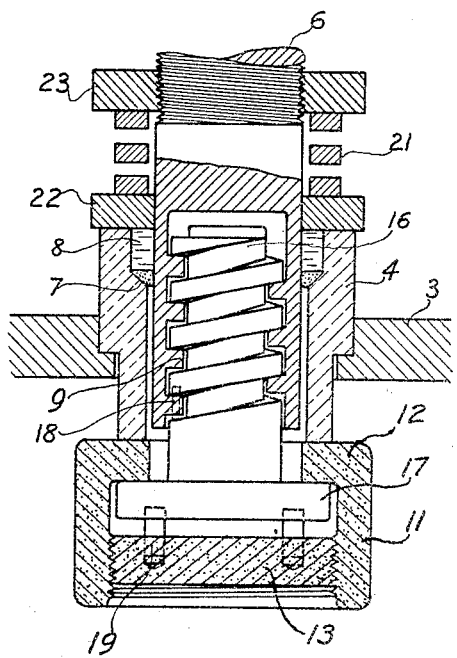
Figure 2:
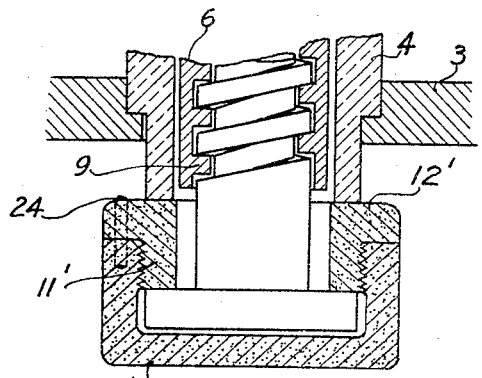

Objects and advantages, other than those above set forth, will be apparent from the following description when read in connection with the accompanying drawing in which Figure 1 is a partial view in vertical cross-section showing one embodiment of a power rectifier anode construction according to the present invention, and Fig. 2 is a partial view similar to that shown in Fig. 1 but showing a modified form of the graphite anode head.

Referring more particularly to the drawing by characters of reference, the reference numeral 3 designates a portion of the cover of a double-walled metallic rectifier tank of the usual construction. The cover has apertures therein through which the anode structure, to be specifically described hereinafter, extends.

An insulator 4 extends through the aperture in the cover in close fitting relation therewith and is supported thereby as is shown. The joint between the cover 3 and the insulator 4 is sealed by any of the known suitable means by which a vacuum tight joint may be obtained as is well-known in the art. An anode stem 6 extends through the insulator 4 and is sealed therein in vacuum-tight relation by a packing 7 arranged in an annular space between the insulator and the stem, which space is then sealed by fluid sealing means such as the mercury shown at 8. The lower end of the anode stem is formed with a recess having an internal screw thread 9.

A substantially cylindrical member 11 of graphite having an inwardly extending flange 12 forms the side wall portion of the anode head. The side wall 11 of the anode is interiorly screw threaded to provide means for the attachment of a face plate 13 of graphite. The anode head structure including the side wall 11 and the face plate 13 is connected with the anode stem 6 by a connector member comprising a threaded stem 16 adapted to engage the thread 9 in the anode stem and a flange head 17 which is integral with the stem and on which the anode head 11, 13 is supported by means of the flange 12.

It will be seen that the anode stem thread and the connector stem thread are so cut as to permit relative movement therebetween in either the axial or the radial direction to allow for differences in expansion thereof. Relative rotation between the anode and connector stems is however prevented, after proper adjustment thereof, by a locking pin 18 engaging both threads and relative rotation between the connector head 17 and the anode head 11, 13 is prevented by inter-connecting pins 19.

The anode head 11, 13 is pressed closely against the insulator 4 by the action of a compression spring 21 surrounding the anode stem above the tank cover 3 and retained between a washer 22 resting on the upper end of the insulator and a nut 23 screw-threaded on the anode stem 6. The compressive stress on flange 12 of the anode head may thus be adjusted as desired.

It will thus be seen that the graphite anode head is stressed only by compression and that means are provided to permit differences in expansion both between the anode stem and the connector and between the connector and the anode head.

The embodiment shown in Fig. 2 differs from that shown in Fig. 1 only in the shape of the anode head portion and somewhat in their manner of connection. The portion 11' is formed as a cylinder having an outwardly extending flange 12' and an interior thread by which the face plate portion 13' having cylindrical side walls bearing a screw thread is retained. Relative rotation between the head portions is prevented by pins 24 passing through flange 12' into face plate 13' after the several portions are properly positioned which pins are also preferably made of graphite.

Although but two embodiments of the present invention have been illustrated and described, it will be apparent to those skilled in the art that various changes and modifications may be made therein without departing from the spirit of the invention or from the scope of the appended claims.

The invention claimed is:

1. An anode structure for electric power rectifiers of the metallic vapor type comprising an insulator, a metallic anode stem extending through said insulator, an anode head of graphite divided into two portions connected by screw threads, a connector having a screw thread engaging the thread in said anode stem to connect said anode head therewith, a locking pin engaging the thread of said anode stem and of said connector to prevent relative rotation therebetween, pins inter-connecting said anode head and said connector to prevent relative rotation therebetween, a spring inter-connecting said insulator and said anode stem to place said anode head under compressive stress, and a nut threadedly engaging said anode stem to vary the compression on said spring.

2. An anode structure for electric current rectifiers comprising an insulator having an aperture therein, an anode stem extending into said aperture and having a flanged end, and an anode of graphite surrounding said flanged end and supported thereby in contact with said insulator.

3. An anode structure for electric current rectifiers comprising an insulator having an aperture therein, an anode stem extending into said aperture and having a flanged end, an anode of graphite surrounding said flanged end and supported thereby, and means causing said anode stem to press said anode into contact with said insulator to thereby close said aperture.

4. An anode structure for electric current rectifiers comprising an insulator having an aperture therein, an anode stem extending into said aperture and having a flanged end, an anode of graphite divided into two connected portions surrounding said flanged end of said stem and supported thereby, and spring means acting on said stem to press said anode into contact with said insulator to thereby close said aperture and to permit relative axial movement between said stem, anode and insulator.

5. An anode structure for electric current rectifiers comprising an insulator having an aperture therein, an anode stem extending into said aperture and having a flanged end, an anode of graphite surrounding said flanged end and supported thereby, spring means acting on said stem to press said anode into contact with said insulator to thereby close said aperture and to permit relative movement therebetween, and means for varying the compressive action of said spring means.

6. An anode structure for electric current rectifiers comprising an insulator having an aperture therein, a metallic anode stem comprising a male part provided with external screw threads about one end thereof and a female part provided with screw threads engaging the screw threads of the male part and being of such pitch and spacing as to permit relative axial and radial movement of the respective said parts, an anode of graphite arranged about and supported by the said male part of said stem, and means acting on said stem causing said anode to be yieldingly pressed against said insulator to thereby limit the compressive stresses thereof and to close said aperture.

7. An anode structure for electric current rectifiers comprising an insulator having an aperture therein, an anode extending through said aperture comprising a male part provided with external screw threads about an end portion thereof, and a female part adjustably connected thereto by internal screw threads provided about an end portion thereof engaging with said external screw threads, the pitch and spacing of the said screw threads being such as to permit relative axial and radial movement of the respective said parts, an anode of graphite arranged about and supported by another end of said male part, a compression spring inter-connecting said stem and said insulator acting on said stem to cause said anode to be pressed against said insulator to close thereby the said aperture, and means for varying the compressive force of said spring to thereby vary and limit the compressive stresses of said anode.

In testimony whereof I have hereunto subscribed my name this 13th day of March, A. D. 1931.

OSKAR SEITZ.